US006176801B1

(12) United States Patent
Chen

(10) Patent No.: US 6,176,801 B1
(45) Date of Patent: Jan. 23, 2001

(54) LOCKING DEVICE OF ELECTRIC TOOL SHAFT

(75) Inventor: Ting-Kuang Chen, Keelung (TW)

(73) Assignee: Trinity Metallize Co., Ltd., Miao-Li Hsien (TW)

( * ) Notice: Under 35 U.S.C. 154(b), the term of this patent shall be extended for 0 days.

(21) Appl. No.: 09/417,225

(22) Filed: Oct. 13, 1999

(51) Int. Cl.[7] .......... F16H 1/32
(52) U.S. Cl. .......... 475/162; 475/168; 192/8 R
(58) Field of Search .......... 475/162, 163, 475/168; 192/8 R, 7, 37, 38, 40

(56) References Cited

U.S. PATENT DOCUMENTS

| | | | | |
|---|---|---|---|---|
| 4,177,887 | | 12/1979 | Kellett et al. . | |
| 5,042,207 | | 8/1991 | Kirn . | |
| 5,460,253 | | 10/1995 | Ritter et al. . | |
| 5,616,095 | * | 4/1997 | Pruitt | 475/178 |
| 5,624,013 | * | 4/1997 | Tsai | 192/8 R |
| 5,732,805 | * | 3/1998 | Nakamura | 192/8 R |
| 5,788,021 | | 8/1998 | Tsai . | |
| 6,010,426 | * | 1/2000 | Nakamura | 477/22 |

* cited by examiner

*Primary Examiner*—Charles A Marmor
*Assistant Examiner*—Tisha O. Waddell
(74) *Attorney, Agent, or Firm*—Bacon & Thomas, PLLC

(57) ABSTRACT

A locking and slowing down device includes a central hole and a recess part, which are connected with each other. The central hole is inserted with an output shaft so that the spline shaft at one end of the output shaft extends into the recess part. The locking and slowing down device also includes an eccentric wheel set composed of a first eccentric wheel and a second eccentric wheel, which are connected with a first gear and a second gear, respectively, to move in opposite direction. The first gear and the second gear have a plurality of first through holes around a circle and second through holes around a circle, respectively. The protruding columns on the rotating plate penetrate through the first through holes and the second through holes, and each protruding column has an outer diameter smaller than the inner diameters of the first through holes and the second through holes. The first gear, the second gear, and the eccentric wheel set are placed within the recess part of the housing base. A spline hole is included in the center of the rotating plate and inserted with the spline shaft of the output shaft. The output shaft can be driven to rotate forwards or backwards with a function of slowing down when the eccentric wheel set is driven to rotate by a power source, and the output shaft can be driven to stop to rotate when the power source stops and drives the output shaft backwards.

3 Claims, 3 Drawing Sheets

LOCKING DEVICE OF ELECTRIC TOOL SHAFT

FIELD OF THE INVENTION

The present invention relates to a locking device of electric tool shaft, and more specifically, to a simpler device, which can drive the electric tool to rotate by electricity or manually, and has a function of unidirectional driving to slow down the rotation speed of the electric tool shaft.

BACKGROUND OF THE INVENTION

The electrical rotating tools in the prior arts commonly utilize electricity as a power source and have different designs, including plug type, recharge type, and plug/recharge type. The electric tool can serve as an electric drill when the chuck of the electric tool clamps a drill, or an electric screwdriver when the chuck of the electric tool clamps a driver. The plug type of electric tool may provide more driving force when the electric socket is available. The recharge type of electric tool, however, provides a convenient selection when the electric socket is not available or the electric socket is too far to connect with the wire. The recharge type of electric tool is sometimes not available when the stored electricity is not sufficient to drive the drill or the screwdriver, and can not recover by recharging at once. The plug type of electric tool will also be not available when the power is shut down. Therefore, the electric tool has to be operated by hand in such conditions. However, the active gear of the traditional electric tool is generally engaged with the gear set, which is engaged with the passive gear connected with the central axle. The passive gear becomes an active gear when the electric tool is forced to rotate by hand to serve as a hand drill or a hand screwdriver. The gear set is further connected with the active gear of the driving motor shaft. As a result, the drill or the screwdriver becomes idling, i.e.; the electric tool can not operate by hand. Moreover, although several improved electric tools, which prevent the output shaft from counter rotating, have been developed, e.g., Taiwan Patent No. 87218052, the structure is more complicated and difficult to manufacture. The present invention, thus, provides an electric tool with an improved locking device to overcome all the shortcomings in the prior arts.

SUMMARY OF THE INVENTION

An object of the present invention is to provide a locking device of electric tool shaft, which uses a specific gear device coordinated with a driving output shaft to allow the output shaft to rotate forwards or backwards by a power source, which runs in only one direction. The output shaft can be locked without rotation when the power source stops.

Another object of the present invention is to provide a locking device of electric tool shaft, which uses a gear device to slow down the output shaft when the output shaft rotates in one uni-direction.

Based on the present invention, the locking device of electric tool shaft includes a central hole and a recess part, which are connected with each other. The central hole is inserted with an output shaft so that the spline shaft at one end of the output shaft extends into the recess part. The locking and slowing down device also includes an eccentric wheel set composed of a first eccentric wheel and a second eccentric wheel, which are connected with a first gear and a second gear, respectively, to move in opposite direction. The first gear and the second gear have a plurality of first through holes around a circle and second through holes around a circle, respectively. The protruding columns on the rotating plate penetrate through the first through holes and the second through holes, and each protruding column has an outer diameter smaller than the inner diameters of the first through holes and the second through holes. The first gear, the second gear, and the eccentric wheel set are placed within the recess part of the housing base. A spline hole is included in the center of the rotating plate and inserted with the spline shaft of the output shaft. The output shaft can be driven to rotate forwards or backwards with a function of slowing down when the eccentric wheel set is driven to rotate by a power source, and the output shaft can be driven to stop to rotate when the power source stops and drives the output shaft backwards.

Other features and advantages of the invention will become apparent from the following description of the invention, which refers to the accompanying drawings.

DETAILED DESCRIPTION OF THE PREFERRED EMBODIMENTS

Figure 1:
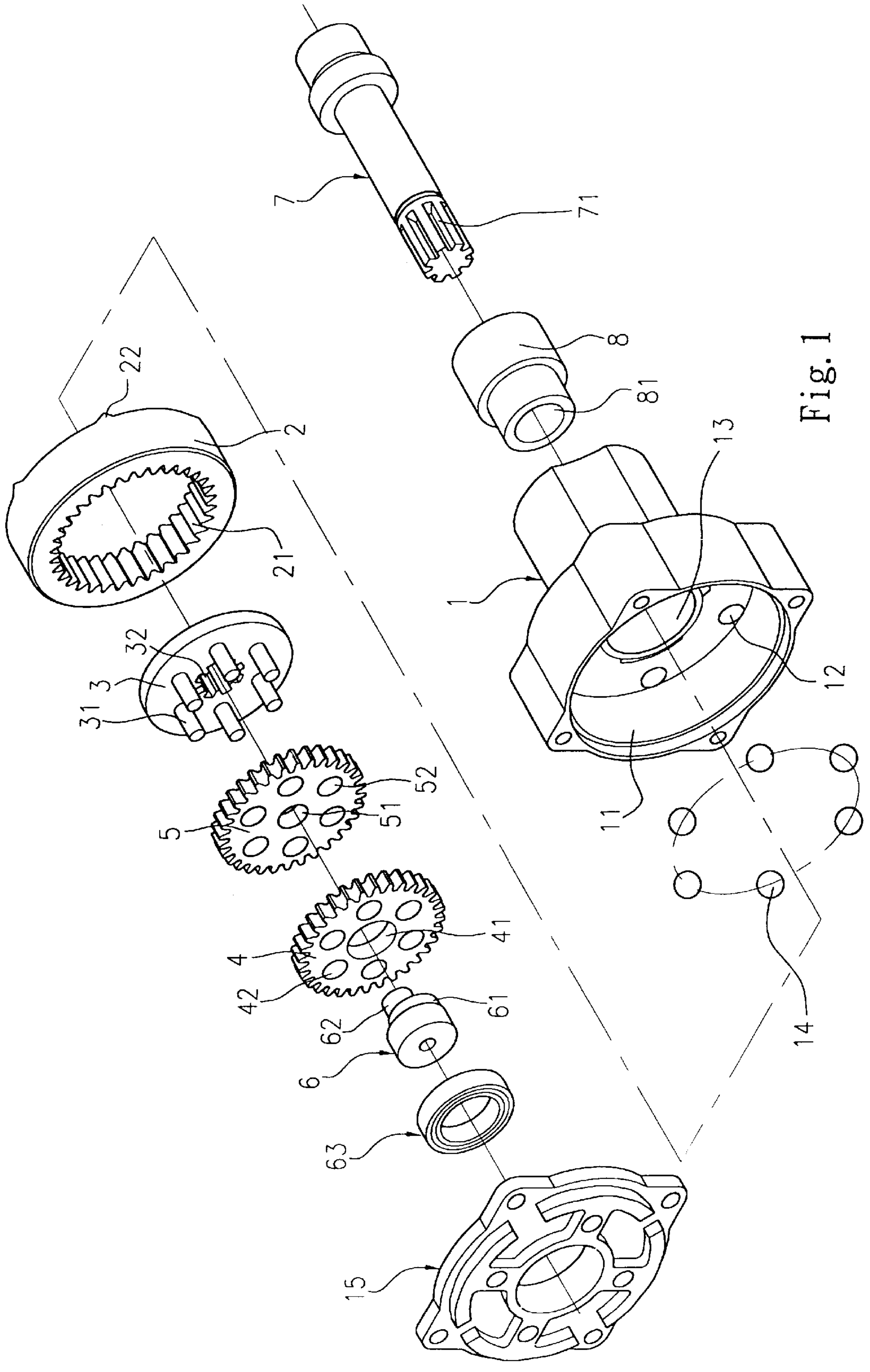
FIG. 1 shows a three-dimensional explosion diagram of main components according to the present invention.

With reference to FIG. 1, the locking device of electric tool shaft according to the present invention consists of a housing base 1, a ring base 2, a rotating plate 3, a first gear 4, a second gear 5, an eccentric wheel set 6, an output shaft 7, a shaft bush 8, and a cover body 15. The housing base 1 has a central hole 13 and a recess part 11, which are concentric. The inner radius of the recess part 11 is larger than the inner radius of the central hole 13. A plurality of holes 12 is arranged around the brim of the inner bottom of the recess part 11. Each hole 12 includes a ball 14 inside, which can freely rotate within the hole 12. The shaft bush 8 is inserted into the central hole 13. The output shaft 7 penetrates the axial hole 81 of the shaft bush 8 so that the output shaft 7 can coordinate with the shaft bush 8 to freely rotate. One end of the output shaft 7 forms a spline shaft 71, which can insert into the recess part 11.

The above ring base 2 is a ring body with an outer radius coordinated with the recess part 11 of the housing base 1 so that the ring base 2 can freely rotate within the recess part 11. The ring base 2 includes an annular gear 21. One side of the ring base 2 has a plurality of projection parts 22 around the brim. In the preferred embodiment, each projection part 22 has two oblique surfaces at two sides such that the ring base 2 can throb and vibrate because of the effect that the projection parts 22 contacts with and slides over the balls 14 when the ring base 2 rotates within the recess part 11.

The above rotating plate 3 is a circular plate with an outer radius smaller than the inner radius of the annular gear 21 of the ring base 2. One side of the rotating plate 3 has a plurality of protruding rods 31 and a spline hole 32 coordinated with the spline shaft 71 of the output shaft 7. The above eccentric wheel set 6 includes a first eccentric wheel 61 and a second eccentric wheel 62, which are fixed together. The first eccentric wheel 61 and the second eccentric wheel 62, which is different from the second central axis of the second eccentric wheel 62. Moreover, the diameter of the first eccentric wheel 61 is larger than the diameter of the second eccentric wheel 62. The eccentric wheel set 6 is connected with a power source (not shown)and coordinated with a bearing 63, which is fixed on the cover body 15 such that the eccentric wheel set 6 can freely rotate with respect to the cover body 15. The above first gear 4 has an outer diameter smaller than the inner diameter of the annular gear 21 of the ring base 2. The teeth of the first gear 4 are fewer than the teeth of the annular gear 21. The first gear 4 includes a first central hole 41 at the central region, which is coordinated with the first eccentric wheel 61 so that the first eccentric wheel 61 can rotate with respect to the first gear 4. The first gear 4 also includes a plurality of first through holes 42, which are around the first central hole 41. The number of the first through holes 42 is the same as the number of the protruding columns 31 of the rotating plate 3. The inner diameter of the first through hole 42 is larger than the outer diameter of the protruding column 31. The above second gear 5 has an outer diameter than the inner diameter of the annular gear 21 of the ring base 2. The teeth of the second gear 5 are fewer than the teeth of the annular gear 21. The second gear 5 includes a second central hole 51 at the central region, which is coordinated with the second eccentric wheel 62 so that the second eccentric wheel 62 can rotate with respect to the second gear 5. The second gear 5 also includes a plurality of second through holes 52, which are around the second central hole 51. The number of the second through holes 52 is the same as the number of the protruding columns 31 of the rotating plate 3. The inner diameter of the second through hole 52 is larger than the outer diameter of the protruding column 31.

Figure 2:
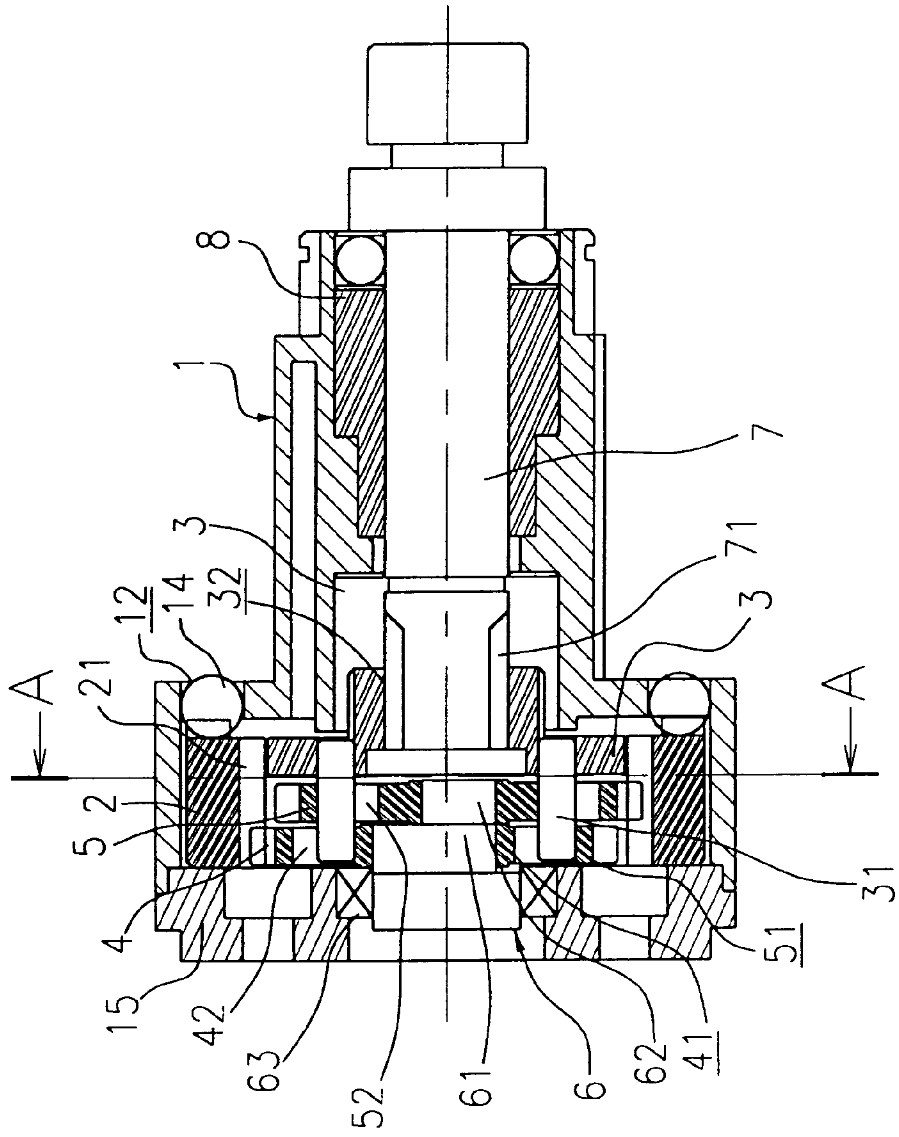
FIG. 2 is a plane view of the main components in FIG. 1 when assembled.
Figure 3:
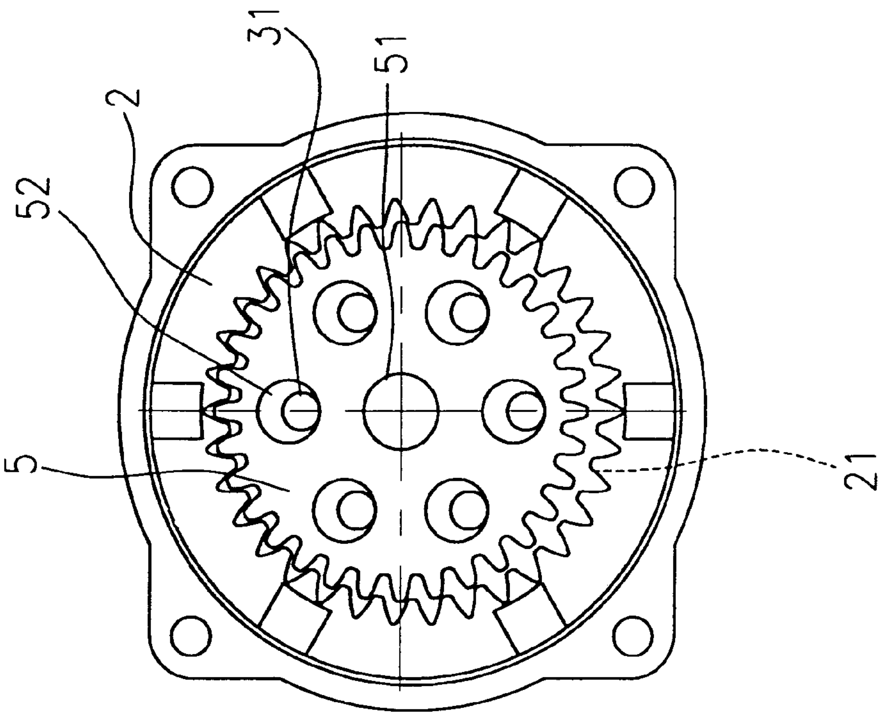
FIG. 3 is a cross-section view along the line A—A in FIG. 2.

With reference to FIG. 2, when the above components of the present invention are assembled, the output shaft 7 penetrates through the axial hole 81 of the shaft bush 8 within the central hole 13 of the housing base 1 so that the spline shaft 71 of the output shaft 7 can extend into the recess part 11. Additionally, the bearing 63 is inserted into the central hole of the cover body 15 and the eccentric gear set 6 is coordinated with the bearing 63 and can freely rotate. The first central hole 41 of the first gear 4 and the second central hole 51 of the second gear 5 are coordinated with the first eccentric wheel 61 and the second eccentric wheel 2, respectively, to freely rotate. Each protruding columns 31 of the rotating plate 3 penetrates through the first through hole 42 of the second gear 5 and the first gear 4 of the second through hole 52 in sequence, and then the rotating plate 3, the first gear 4, the second gear 5, and the eccentric wheel set 6 are placed into the annular gear 21 of the ring base 2, which is within the recess part 11. Therefore, the spline shaft 71 penetrates through the spline hole 32 of the rotating plate 3, and the tooth parts of the first gear 4 and the second gear 5 simultaneously engage with the annular gear 21 of the ring base 2 (as shown in FIG. 3).

The above eccentric gear set 6 is connected with a power source (e.g. a motor and a slow down device). When the power source drive the eccentric gear set 6 to rotate (forwards or backwards), the first eccentric wheel 61 and the second eccentric wheel 62 simultaneously drive the first gear 4 and the second gear 5, respectively, to rotate within the annular gear 21. The first gear 4 and the second gear 5 is slowed down by the slow down effect due to the tooth difference between the annular gear 21 and the first gear 4 and the tooth difference between the annular gear 21 and the second gear 5 so that the rotating plate 3 is driven to rotate with retardation and then the rotating plate 3 further drives the output shaft 7 to rotate. The rotating plate 3 keeps fixed without rotation when the power source stops and drives the output shaft 7 to rotate backwards because the rotating plate 3 is also limited by the first gear 4 and the second gear 5, which are engaged with the annular gear 21 of the ring base 2. Therefore, the output shaft 7 keeps fixed without rotation so as to achieve the function of uni-direction force output when the power source stops. Moreover, the present invention has a simpler structure and becomes more feasible and improved.

Although only the preferred embodiments of this invention were shown and described in the above description, it is requested that any modification or combination that come within the spirit of this invention be protected.

What is claimed is:

1. A locking device of electric tool shaft, comprising:

a housing base, comprising a central hole and a recess part, which are concentric;

a ring base, located in said recess part of the housing base, able to freely rotate within said recess part, and having an annular gear;

a rotating plate, which has a spline hole at a center part and an outer radius smaller than an inner radius of said annular gear of the ring base, one side of said rotating plate comprising a plurality of protruding columns arranged around a circle;

an eccentric wheel set, connected with a power source and comprising a first eccentric wheel and a second eccentric wheel, which are fixed together;

a first gear, having an outer diameter smaller than said inner diameter of the annular gear of the ring base and having a plurality of teeth fewer than teeth of the annular gear, wherein said first gear comprise a first central hole at a central region, which is coordinated with said first eccentric wheel so that the first eccentric wheel can rotate with respect to the first gear, and said first gear further comprises a plurality of first through holes, which are around said first central hole, wherein a number of said first through holes is a same as a number of said protruding columns of the rotating plate, and an inner diameter of said first through hole is larger than an outer diameter of said protruding column;

a second gear, having an outer diameter smaller than said inner diameter of the annular gear of the ring base and having a plurality of teeth fewer than teeth of the annular gear, wherein said second gear comprise a second central hole at a central region, which is coordinated with said second eccentric wheel so that the second eccentric wheel can rotate with respect to the second gear, and said second gear further comprises a plurality of second through holes, which are around said second central hole, wherein a number of said second through holes is a same as a number of said protruding columns of the rotating plate, and an inner diameter of said second through hole is larger than an outer diameter of said protruding column;

a cover body, accommodating said eccentric wheel set, which can freely rotate with respect to said cover body; and an output shaft, penetrating through said central hole of the housing base and comprising a spline shaft, which extends into said recess part of the housing base;

wherein said first central hole of the first gear and said second central hole of the second gear are coordinated with said first eccentric wheel and said second eccentric wheel, respectively, each said protruding column of the rotating plate sequentially penetrates through said second through hole of the second gear and said first through hole of the first gear so that said first gear and said second gear are not concentric, and then said first gear, said second gear, and said eccentric wheel set are placed within said annular gear of the ring base to allow said first gear and said second gear to engaged with said annular gear; wherein said spline shaft of the output shaft is inserted into said spline hole of the rotating plate; wherein said output shaft can be driven to rotate forwards or backwards with a function of slowing down when said eccentric wheel set is driven to rotate by said power source, and said output shaft can be driven to stop to rotate when said power source stops and drives said output shaft backwards.

2. The device as claimed in claim 1, wherein one side of said ring base comprises a plurality of projection parts arranged around a brim, and said recess part of the housing base comprises a plurality of balls such that the ring base can throb and vibrate because said projection parts contacts with and slides over said balls when the ring base rotates within the recess part.

3. The device as claimed in claim 1, wherein said first gear and said second gear are coordinated with said eccentric wheel set and move forward in opposite direction.

* * * * *